Nov. 3, 1970 R. G. POPOVICH 3,538,248

IMPULSE NOISE IMMUNE CIRCUITRY

Filed June 19, 1967

WITNESSES:
Bernard R. Gregory
James F. Young

INVENTOR
Richard G. Popovich
BY
Samuel O. Ski
ATTORNEY

United States Patent Office 3,538,248
Patented Nov. 3, 1970

3,538,248

IMPULSE NOISE IMMUNE CIRCUITRY

Richard G. Popovich, Middletown, N.J., assignor to Westinghouse Electric Corporation, Pittsburgh, Pa., a corporation of Pennsylvania Filed June 19, 1967, Ser. No. 647,053
Int. Cl. H04n 5/52
U.S. Cl. 178—7.3 14 Claims

ABSTRACT OF THE DISCLOSURE

The present disclosure relates to a noise immune sync separating and automatic gain contral system for use in a television receiver receiving televison signals including video and synchronizing information and subject to noise impulses of excessive amplitude. In the noise immune system the television is detected and applied to a video amplifier to provide a output having a predetermined polarity. This output is supplied to a sync amplifier for providing an amplified output of a proper polarity to activate a sync separating stage to separate the synchonizing information from the composite television signal. The automatic gain control stage is supplied by signals having a polarity to which the sync separating stage is responsive. A noise circuit is employed including a switching device which is responsive to excessive amplitude noise impulses to cause the sync amplifier to be driven heavily into conduction and provide an output to which the sync separator is non-responsive and also rendering the automatic gain control stage non-responsive to the noise impulses.

BACKGROUND OF THE INVENTION

The present invention relates to noise immune circuitry for use in television receivers and more particularly to noise immune sync separating-automatic gain control systems for use in television receivers subject to impulse noise.

A variety of techniques have been utilized to prevent noise from adversely affecting the operation of a television receiver. The sync separating circuit is especially susceptible to impulse noise wherein noise impulses exceed the amplitude of the sync tips. The application of such noise impules to the sync separator stage of the television receiver causes disruption of the synchronizing circuit and may even block out synchronization of the receiver until some corrective action is taken. The automatic gain control circuitry is also susceptible to noise impulses of excessive amplitude which may cause the AGC circuitry to provide improper outputs causing the RF and IF stages of the receiver to respond to the noise impulses rather than to the true amplitude of the incoming video information.

Among the circuit techniques which have been employed in attempting to immunize a television receiver are noise inversion, noise cancellation, noise suppression, noise suicide circuitry, as well as various combinations of these techniques. Such circuitry has proven more or less reliable depending upon the particular receiver circuitry utilized and the types of noise encountered. Acceptability of the circuit techniques also depends upon their complexity and effectiveness as compared to the increased cost of the television receiver. The use of transistorized and hybrid combination of transistors and vacuum tube circuitry in television receivers introduces the further problem of providing noise immunization capable of meeting the circuit requirements of the solid state hybrid designs.

SUMMARY OF THE INVENTION

It is therefore an object of the present invention to provide a new and improved noise immune sync separating-automatic gain control system for use in a television receiver subject to impulse noise of excessive amplitude.

Boradly, the present invention provides a noise immune sync separating-automatic gain control system for use in a television receiver receiving television signals including video and synchronizing information and subject to noise impulses of excessive amplitude wherein noise circuitry is provided which in response to noise impulses permits outputs to be supplied to the sync separating stage to which the sync separating stage is non-responsive and also renders the automatic gain control stage non-responsive to the noise impulses.

DESCRIPTION OF THE PREFERRED EMBODIMENTS

Figure 1:
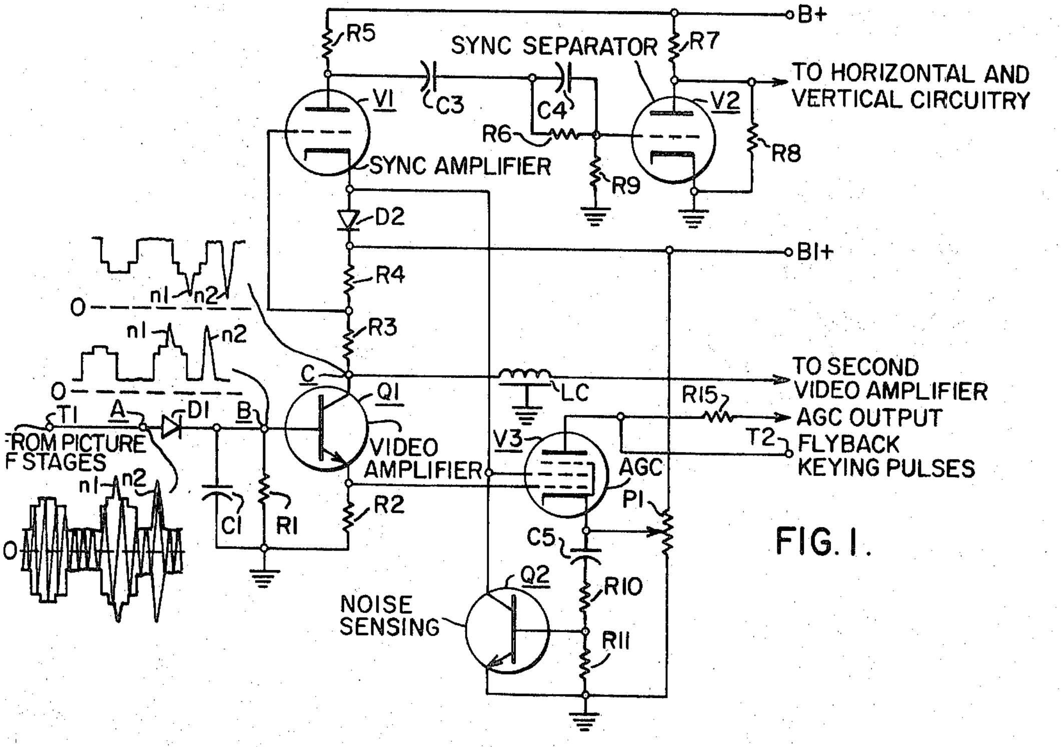
FIG. 1 is a schematic diagram of one embodiment of the present invention.

Referring to FIG. 1, the noise immune system of the present invention is shown for inclusion in a television receiver, however, with only pertinent portions of the receiver circuitry being shown for purposes of clarity. A composite television signal including video and synchronizing information is applied to a terminal T1 from the picture and IF stages of a standard television receiver. Such a composite waveform is shown at the point A in FIG. 1. This waveform is applied to a video detector including a diode D1 and an RC circuit including a capacitor C1 and a resistor R1. The detected composite waveform is shown at point B and is applied to the base electrode of a transistor Q1 which forms the active element of the first video amplifier of the receiver. An emitter resistor R2 is connected between the emitter of the video amplifier transistor Q1 and ground. The collector of the transistor Q1 is coupled via a voltage divide network including resistors R3 and R4 to a source of positive voltage B1+ which is of a suitable value for applying operating potential for the transistor Q1.

A first output is taken from the video amplifier at the collector of the transistor Q1 and has a waveform as shown at the point C. The waveform at the base of the transistor Q1 as shown at point B has the sync tips positive going with respect to ground. Thus, at the collector of the transistor Q1 the sync tips are inverted with the sync tips negative going toward ground. A second output from the transistor Q1 is taken at the emitter electrode thereof with the waveform appearing there being substantially the same as shown in the waveform at point B with the sync tips positive going. The first output of the video amplifier appearing at the collector of the transistor Q1 is applied to a delay line LC and therethrough to a second video amplifier of the receiver. The output from the collector of the transistor Q1 is also divided down by the resistor R3 and applied to the grid of the tube V1 which comprises the active element of a sync amplifier. The anode of the tube V1 is coupled through a plate resistor R5 to a source of B+ potential suitable for vacuum tube operation. A diode D2 has its anode electrode connected to the cathode of the tube V1 and its cathode connected to the B1+ source at the top end of the resistor R4.

In the absence of impulse noise appearing in the composite television signal, the sync amplifier operates as a class A amplifier so that the diode D2 connected in the cathode circuit of the tube V1 is forward biased thereby clamping the cathode of tube V1 to the B1+ voltage. The signal from the collector of the transistor Q1 is divided down in the R3–R4 divider and applied to the grid of the tube V1 for amplification therein and inversion so that sync tips now appear positive going at the plate of the tube V1. The amplified waveform at the plate of the tube V1 is applied through a coupling capacitor C3 to a time constant circuit including a capacitor C4 and resistors R6 and R9. The other end of the time constant circuit is connected to the grid of a sync separator tube V2. The cathode of the tube V2 is grounded, while the anode thereof is coupled through a plate resistor R7 to the B+ line. A load resistor R8 is connected between the plate of the tube V2 and ground. The sync separator tube V2 operates as a peak detector as is commonly done for the separation of the synchronizing pulses from the composite waveform. The components for the time constant circuit C4, R6, and R9, are so selected that the sync tip pulses drive the sync separator tube V2 into grid current thus clamping the sync tips to ground potential. In response to the conduction of the tube V2 between the grid and the cathode when the sync tip pulses are applied thereto, this is sensed at the plate of the tube V2 thereby separating the sync tip pulses from composite television signal. The sync separator tube V2 is thus responsive to positive going signals which are of a predetermined amplitude which is selected to be the sync tip level.

The second output from the video amplifier transistor Q1 is taken from the emitter electrode thereof and applied to the control grid of an AGC tube V3 which is shown to be a pentode. The cathode and suppressor grids of the pentode AGC tube are commonly connected. A potentiometer P1 is connected between the B1+ source and ground, the tap thereof being connected to the cathode of the AGC tube V3. The potentiometer functions as an AGC level control for the AGC circuit. The screen grid of the AGC tube V3 is connected to the anode of the diode D2. Thus, under normal operating conditions in the absence of noise when the diode D2 is forward biased, the screen grid will be connected to the B1+ source. The screen grid is also connected to the collector electrode of a noise sensing transistor Q2. The transistor Q2 is responsive to the output of the AGC tube in its cathode circuit, the cathode of the AGC tube V3 being coupled to the transistor Q2 through a coupling capacitor C5 to a voltage divide network including resistors R10 and R11. The junction point of the resistors R10 and R11 is connected to the base electrode of the noise sensing transistor Q2 with the emitter electrode of the transistor Q2 and the bottom end of the resistor R11 being grounded.

Under normal operating conditions in the absence of noise, the AGC circuit including the tube V3 operates normally as a keyed AGC circuit with flyback keying pulses being applied to the plate electrode thereof from a terminal T2, the keying pulses usually being supplied from the flyback transformer of the television receiver. The AGC tube V3 is normally nonconductive until a keying pulse is applied thereto and a signal is applied to the control grid thereof that is equivalent to or exceeds the sync tip level. When these conditions occur tube V3 is rendered conductive with current flow provided between the plate and cathode electrodes thereof. When the tube V3 is rendered conductive, the signal current in the cathode circuit thereof is coupled through the coupling capacitor C5 to the voltage divide circuit R10 and R11. In the absence of noise impulses exceeding the sync tip level, the resistors R10 and R11 are so selected that the voltage from base to emitter of the transistor Q2 is not sufficient to render this transistor conductive between collector and emitter thereof. Therefore, with the noise sensing transistor Q2 in its nonconductive state, the diode D2 will remain forward biased with biasing potential from the source B1+ being supplied to the cathode of the sync amplifier tube V1 and to the screen grid of the AGC tube V3 to permit the normal operation of these tubes. The AGC output of the AGC tube V3 is developed at the plate thereof and applied through a plate resistor R15 to supply the AGC output for the RF and IF stages of the television receiver as is well known in the art.

Assume that when a noise impulse exceeding the sync tip level is received during the sync tip portion of the incoming television signal such as the impulse *n*1. This noise impulse *n*1 is supplied through the video detector to the video amplifier and Q1 appears at the emitter of the transistor Q1 as a positive going pulse exceeding the sync tip level. Ths pulse is then applied to the control grid of the AGC tube V3 causing this tube to be conductive between control grid and cathode. In response to the noise impulse which is of a higher amplitude than the normal sync tip level, the signal is coupled through the capacitor C5 to the voltage divide resistors R10 and R11 and is of sufficient amplitude to drive the noise sensing transistor Q2 into saturation. The saturation of the transistor Q2 occurs very rapidly in response to the excess amplitude noise impulse. Since the anode of the diode D2 is connected at the collector of the transistor Q2, when the transistor Q2 is driven into saturation, the diode D2 is reverse biased with its cathode electrode being at the B1+ voltage while its anode is clamped substantially to a ground potential. This blocks the B1+ voltage from being applied to the cathode of the sync amplifier tube V1 with the cathode thereof being held at ground potential. Since the cathode of the sync amplifier tube V1 is grounded, the tube is turned on very hard for the grid thereof is normally positive with respect to ground with diode D2 forward biased. Therefore, a negative going noise impulse is provided at the plate of the tube V1. As previously explained the sync separator tube V2 is normally responsive to positive going sync tips. Thus, the appearance of a negative going noise impulse in the plate circuit of the sync amplifier tube V1 translated to the coupling capacitor C2 and the time constant circuit C4, R6 and R9 is of the opposite polarty to which the sync separator tube V2 is responsive. Therefore, the operation of the sync separator tube V2 will only be affected during the appearance of the negative going noise impulse, the tube reverting to normal operation at the end of the noise impulse with the output of the sync amplifier again going positive. The sync separator will then be operative in response to the next positive going sync tip pulse to provide the proper sync separated output therefrom even though noise is initially present in the input television signal.

Still assuming that a nose impulse occurs during the sync tip portion of the television signal, the saturation of the transistor Q2 in response to the noise impulse *n*1 also causes the screen grid of the AGC tube V3 to be clamped to substantially ground potential therethrough. This stops the electron beam from the cathode of the tube V3 from reaching the plate electrode thereof. Thus, no output appears at the plate of the AGC tube V3 in response to the noise impulse which prevents any AGC output from being developed therefrom that is not related to the amplitude level of the input television signal and that would be disruptive of the gain levels of the television receiver RF and IF stages. Normal operation of the AGC stage continues once the noise impulse has terminated.

At the termnaiton of the noise impulse, the transistor Q2 goes to its non-conductive state with the diode D2 again being forward biased clamping the cathode of the sync amplifier tube V1 to the B1+ potential to supply the normal biasing potential. Also, the screen grid of the AGC tube V3 is then unclamped from ground and supplied with this normal operating potential via the forward biased diode D2 from the B1+ source.

If a noise impulse, such as the impulse *n*2 in FIG. 1, occurs during the video portion of the television signal and is applied to the control grid of the AGC tube V3, the control grid-cathode diode of the tube V3 will conduct to provide an output signal to trigger on the transistor Q2. However, since a flyback keying pulse is not applied to the plate of the tube V3 during the video portion no output will appear at the plate of the tube V3 in response to the noise. However, the conduction of transistor Q2 does clamp the cathode of sync amplifier tube V1 to ground in order to reverse bias the diode D2 and drive the tube V1 heavily into conduction. As previously explained, in response to the heavy conduction of tube V1 negative going noise appears in the plate circuit of the sync amplifier tube V1. Thus, the sync separator tube which is responsive to positive going signals is essentially non-responsive to the noise, with normal operation of the sync separator resuming once the noise impulse has terminated.

Figure 2:
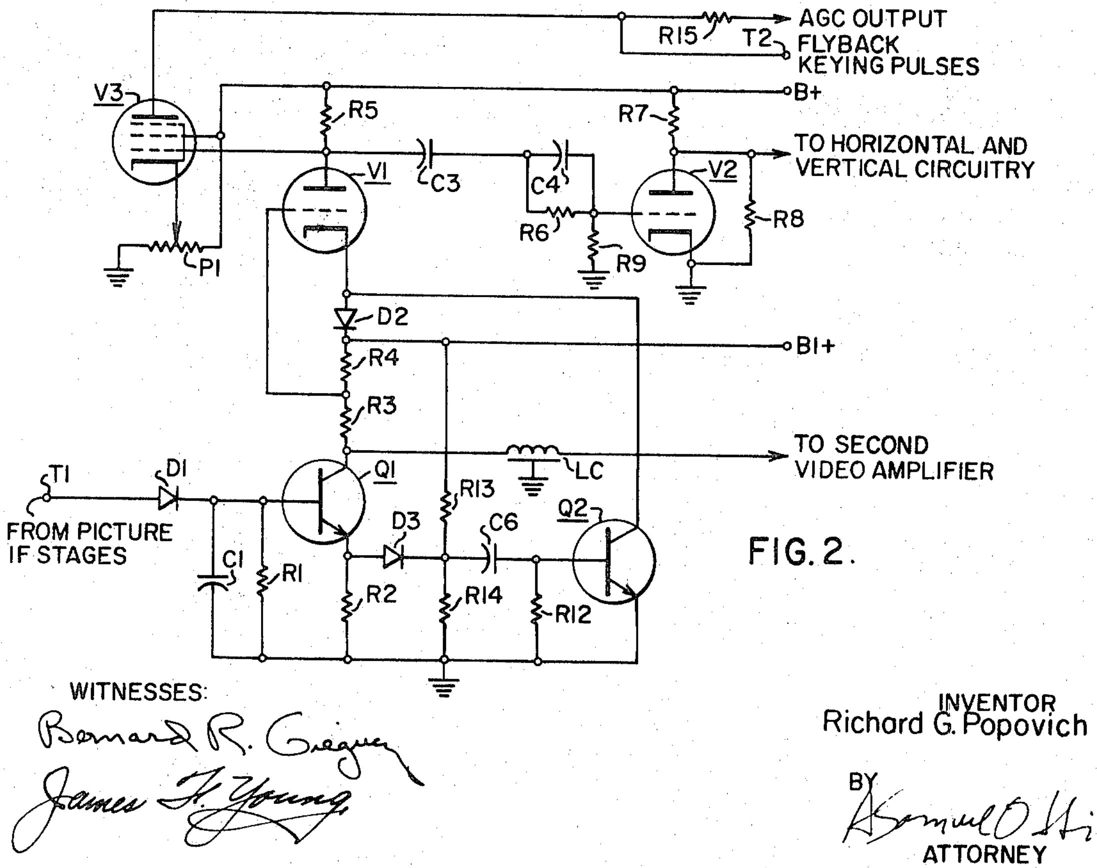
FIG. 2 is a schematic diagram of another embodiment of the present invention.

FIG. 3 shows another embodiment of the present invention where it is desired to supply the control grid of the AGC tube V3 with a higher level input signal than is available at the emitter electrode of the video amplifier transistor Q1. In FIG. 2 the grid of the AGC tube V3 is supplied by a plate of the sync amplifier tube V1 which is at the same polarity as that at the emitter of the transistor Q1, however, with added gains of both the video amplifier and the sync amplifier. In FIG. 2, the video detector, first video amplifier, sync amplifier and sync separator circuitry is substantially the same as shown in FIG. 1. The plate of the sync amplifier tube V1, however, in connected to the control grid of the AGC tube V3. The screen grid of the AGC tube V3 is returned to B+ potential which also supplies the sync amplifier tube V1 and sync separator tube V2. The AGC level control potentiometer P1 also is returned to the B+ source.

The noise sensing transistor Q2 is connected in the emitter circuit of the transistor Q1 rather than in the cathode circuit of the AGC tube V3 as was the case in the embodiment of FIG. 1. A voltage divider network including a resistor R13 and a resistor R14 is connected between the B1+ source and ground, with a diode D3 being connected between the emitter electrode of the transistor Q1 and the junction between the resistors R13 and R14. The resistors R13 and R14 are so selected that the diode D3 is reverse biased until a noise impulse exceeding the sync tip level is applied to the anode electrode thereof from the emitter of the transistor Q1. When a noise impulse of excessive amplitude is received, this causes the diode D3 to be forward biased to supply a signal therethrough to a coupling capacitor C6 which is connected between the cathode of the diode D3 and the base of the noise sensing transistor Q2. A resistor R12 is connected between the base of the transistor and ground.

In response to a noise impulse being translated through to the base of the transistor Q2, this transistor is rapidly saturated which causes the diode D2 connected between the cathode of the sync amplifier tube V1 and the B1+ source to be reverse biased. The cathode of the sync amplifier tube V1 is thus clamped to substantially ground potential through the transistor Q2 and is thereby driven heavily in conduction to cause negative going noise to appear in the plate circuit thereof. As previously explained, the sync separator tube V2 is response to positive going sync tip level pulses thereby will return to normal operation once the noise pulse has terminated. Also the AGC tube V3 is normally responsive to positive going sync tip level pulses and will return to normal operation once the negative going noise impulse applied to the grid thereof from the plate of the sync amplifier tube V1 has terminated.

Once the noise impulse is terminated the diode D3 reverts to its normal reverse bias state and transistor Q2, i.e., turns to its normally non-conductive state thereby unclamping the cathode of the sync amplifier V1 to permit the diode D2 to again be forward biased and return the sync amplifier to normal operation. Upon the resumption of normal operation of the sync amplifier, the sync separator and AGC stages, being supplied from the plate thereof, also operate normally in the absence of impulse noise.

In summary, it can therefore be seen that in both the embodiments of FIG. 1 and FIG. 2 the presence of impulse noise having amplitudes in excess of sync tip level is prevented from affecting the operation of both sync separating and AGC stages of the television receiver. However, it should be noted this noise immunization is accomplished with relatively few components and relatively uncomplex and dependable circuitry.

Although the present invention has been described with a certain degree of particularity, it should be understood that the present disclosure has been made only by way of example and that numerous changes in details of the circuitry and the combination and arrangement of elements and components can be resorted to without departing from the scope and the spirit of the present invention.

What is claimed is:

1. A noise immune sync separating-automatic gain control system for use in a television receiver receiving television signals including video and synchronizing information and subject to noise impulses of excessive amplitude comprising:
detecting means for detecting said television signals and providing detected signals of a given polarity;
video amplifying means responsive to said detected signals for providing a first output of the opposite polarity from said given polarity;
sync amplifying means responsive to said first output for normally providing in the absence of said noise impulses an amplified output of a predetermined polarity;
sync separating means for receiving said amplified output and being responsive to said predetermined polarity exceeding a predetermined amplitude to separate said synchronizing information from said television signals;
automatic gain control means responsive to said given polarity and providing an AGC output therefrom; and
noise means responsive to said noise impulses for causing said sync amplifying means to be activated in response to said noise impulses to provide an output to said sync separating means of a polarity opposite to which said sync separating means is responsive, and rendering said automatic gain control means non-responsive to said noise impulses.

2. The system of claim 1 wherein:
said predetermined polarity being said given polarity.

3. The system of claim 2 including:
a source of biasing potential for said sync amplifying means; and wherein
said noise means is operative to deactivate said sync amplifying means from said source in response to said noise impulses.

4. The system of claim 3 wherein:
said video amplifying means providing a second output of said given polarity;
said second output being applied to said automatic gain control means.

5. The system of claim 4 wherein:
said source of biasing potential also provided for said automatic gain control means, and
said noise means operate to deactivate said source from said automatic gain control means and render it non-responsive to said noise impulses at the AGC output thereof.

6. The system of claim 3 wherein:
said sync amplifying means supplying its amplified output to said automatic gain control means of said predetermined polarity to activate said automatic gain control means in the absence of said noise impulses, and to supply an output of a polarity to render said automatic gain control means non-responsive thereto in the presence of said noise impulses.

7. The system of claim 5 wherein:
said noise means including a switching device responsive to said noise impulses to cause said sync amplifying means to have an output in response thereto of such a polarity as to not affect the operation of said sync separating means for a period of time not longer than the duration of said noise impulses, and to deactivate said automatic gain control means during the period of said noise impulses.

8. The system of claim 7 wherein:
said noise means including a rectifying device operatively connected between said source and said sync amplifying means and said automatic gain control means for supplying biasing potential thereto in the absence of said noise impulses and blocking biasing potential in response to said switching means being activated in response to said noise impulses.

9. The system of claim 6 wherein:
said noise means including a switching device responsive to said noise impulses to cause said amplifying means to have an output in response thereto of such a polarity to not affect the operation of said sync separating means and said automatic gain means for a period of time not longer than the duration of said noise impulses.

10. The system of claim 9 wherein:
said noise means including a rectifying device operatively connected between said source and said sync amplifying means for supplying biasing potential thereto in the absence of said noise impulses and blocking biasing potential in response to said switching means being activated in response to said noise impulses.

11. The system of claim 8 wherein:
said sync amplifying means including an amplifier electron tube having anode, catode and control electrodes, said first output being applied to said control electrode, said amplified output thereof appearing at said anode electrode, and said cathode electrode coupled through said rectifying device to said source, and having applied thereto an output from said switching means in response to said noise impulse to drive said electron tube heavily into conduction and provide an output at said anode electrode thereof of such a polarity to which said sync separating means is non-responsive.

12. The system of claim 11 wherein:
said automatic gain control means including an AGC electron tube having anode, cathode and control electrodes, and
said switching means comprising a transistor including input and output electrodes, an input electrode thereof being connected in the cathode sirsuit of said AGC tube, and said transistor being activated in response to said noise impulses, an output electrode of said transistor being connected to said cathode electrode of said amplifier tube and to a control eltctrode of said AGC tube to drive said amplifier tube heavily into conduction and to interrupt the electron stream in said AGC tube in response to said noise impulses.

13. The system of claim 10 wherein:
said sync amplifying means including an amplifier electron tube having anode, cathode and control electrodes, said first output being applied to said control electrode, said amplified output thereof appearing at said anode electrode, and said cathode electrode coupled through said rectifying device to said source, and having applied thereto an output from said switching means in response to said noise impulse to drive said electron tube heavily into conduction and provide an output at said anode electrode thereof of such a polarity that said sync separating means is non-responsive.

14. The system of claim 13 wherein:
said switching means including a transistor having input and output electrodes, said noise impulses being applied from said second output to an input electrode of said transistor, and an output electrode thereof connected to said cathode electrode of said amplifier tube so that in response to said transistor being activated in response to said noise impulses said amplifier tube being driven heavily into conduction.

References Cited

UNITED STATES PATENTS

| | | |
|---|---|---|
| 2,823,257 | 2/1958 | Sonnenfeldt. |
| 3,109,061 | 10/1963 | Kramer. |
| 3,236,946 | 2/1966 | Hansen. |
| 3,441,669 | 4/1969 | Janson et al. |

RICHARD MURRAY, Primary Examiner

R. P. LANGE, Assistant Examiner

U.S. Cl. X.R.

178—75